United States Patent [19]

Radkey et al.

[11] 4,406,433
[45] Sep. 27, 1983

[54] LEADING EDGE INLET FOR RAM AIR PRESSURIZED AIRFOIL

[75] Inventors: Robert L. Radkey, Long Beach; Bart D. Hibbs, Altadena, both of Calif.

[73] Assignee: Aerovironment, Inc., Pasadena, Calif.

[21] Appl. No.: 217,794

[22] Filed: Dec. 18, 1980

[51] Int. Cl.³ .............................................. B64D 17/02
[52] U.S. Cl. ..................................... 244/145; 40/215; 73/189; 273/360; 244/146; 244/53 B; 244/DIG. 1
[58] Field of Search ......... 244/142, 145, 146, DIG. 1, 244/210, 207, 219, 53 B; 40/215; 273/360, 361; 73/189

[56] References Cited

U.S. PATENT DOCUMENTS

| | | | |
|---|---|---|---|
| 2,306,759 | 12/1942 | Sears | 244/210 |
| 3,480,238 | 11/1969 | Barish | 244/146 |
| 3,972,495 | 8/1976 | Jalbert | 244/145 |
| 4,129,272 | 12/1978 | Jones et al. | 244/145 |

FOREIGN PATENT DOCUMENTS

| | | | |
|---|---|---|---|
| 2278568 | 3/1976 | France | 244/210 |
| 2310258 | 1/1977 | France | 244/DIG. 1 |
| 596367 | 1/1948 | United Kingdom | 244/219 |

Primary Examiner—Galen L. Barefoot
Attorney, Agent, or Firm—Harvey B. Jacobson

[57] ABSTRACT

The air scoop opening at the leading edge of a flexible, ram-air inflated airfoil canopy, is framed between curved lip sections extending tangentially from the upper and lower surface members of the canopy to prevent airflow separation adjacent the leading edge and the drag producing effect thereof. A baffling curtain extends across the air scoop opening.

2 Claims, 3 Drawing Figures

LEADING EDGE INLET FOR RAM AIR PRESSURIZED AIRFOIL

BACKGROUND OF THE INVENTION

This invention relates to ram air inflated airfoil-shaped, flexible canopies associated with gliding types of parachutes or the like.

Parachute canopies of the foregoing type are provided with air scoop inlet openings along the leading edge portion through which an inflow of air is received to internally pressurize and inflate the canopy to its airfoil shape during forward glide. Although the ram air scoop inlet is necessary to maintain the canopy inflated, it is also a source of drag because of turbulence and airflow separation along the outer surface members of the canopy adjacent the leading edge portion. A reduction in forward glide speed therefore results as well as some instability because of turbulence.

Modification of the leading edge portion of a ram air inflated, airfoil shaped canopy has heretofore been proposed for different purposes unrelated to the airflow separation problem. According to U.S. Pat. No. 3,972,495, issued Aug. 3, 1976 to Jalbert, the ram air inlet opening in the leading edge has a grill through which air enters and a flutter valve to close the inlet opening in response to internal inflation pressure to thereby avoid the affects of wind on inflation maintaining airflow. According to U.S. Pat. No. 4,129,272, issued Dec. 12, 1978 to Jones et al, an inlet opening in the leading edge is also covered by a grill while a flexible stiffening spar is externally secured to the leading edge portion just below the inlet opening to deform the leading edge portion spanwise through control lines for accommodating high wind velocities. Thus, the structural modification suggested by the prior art are unrelated to and incapable of dealing with the drag problem caused by airflow separation.

It is therefore an important object of the present invention to provide a ram air inflated, airfoil shaped canopy which minimizes airflow separation extending from the edges of the air scoop opening at the leading edge portion.

SUMMARY OF THE INVENTION

In accordance with the present invention, the leading edge portion of a ram air inflated, airfoil shaped parachute canopy is provided with upper and lower curved lip sections extending tangentially from the upper and lower outer flexible surface members and terminating in spaced relation to each other to define the air scoop opening thereby spaced rearwardly from the forward points on the leading edge portion. A perforated, baffling curtain extends across the air scoop opening between the upper and lower surface members to separate the air scoop passage formed between the lip sections and an internal static pressure region within the canopy.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING FIGURES

DETAILED DESCRIPTION OF PREFERRED EMBODIMENT

Figure 1:
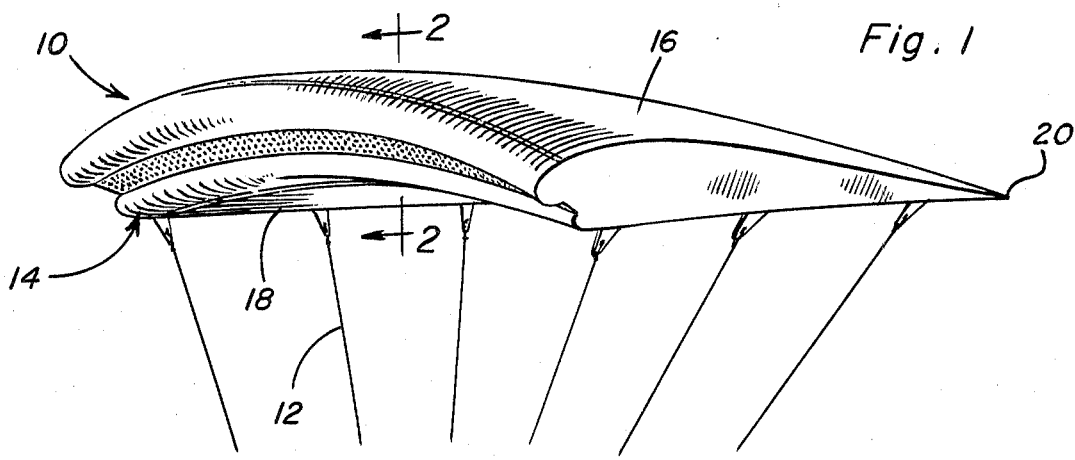
FIG. 1 is a perspective view illustrating an inflated airfoil shaped parachute canopy having a leading edge portion constructed in accordance with the present invention.

Referring now to the drawings in detail, FIG. 1 illustrates a parachute canopy generally referred to by reference numeral 10 to which playload suspension lines 12 are connected. The canopy 10 is of a generally well-known type except for the leading edge portion 14 from which upper and lower outer surface members 16 and 18 extend to a trailing edge 20. This type of canopy is maintained inflated, after deployment of the parachute, by an inflow of air during forward glide descent. The inflated airfoil shape of the canopy produces lift as a result of the airflow over the outer surface members from the leading to the trailing edge portions to enhance forward glide as is well-known in the art.

Figure 2:
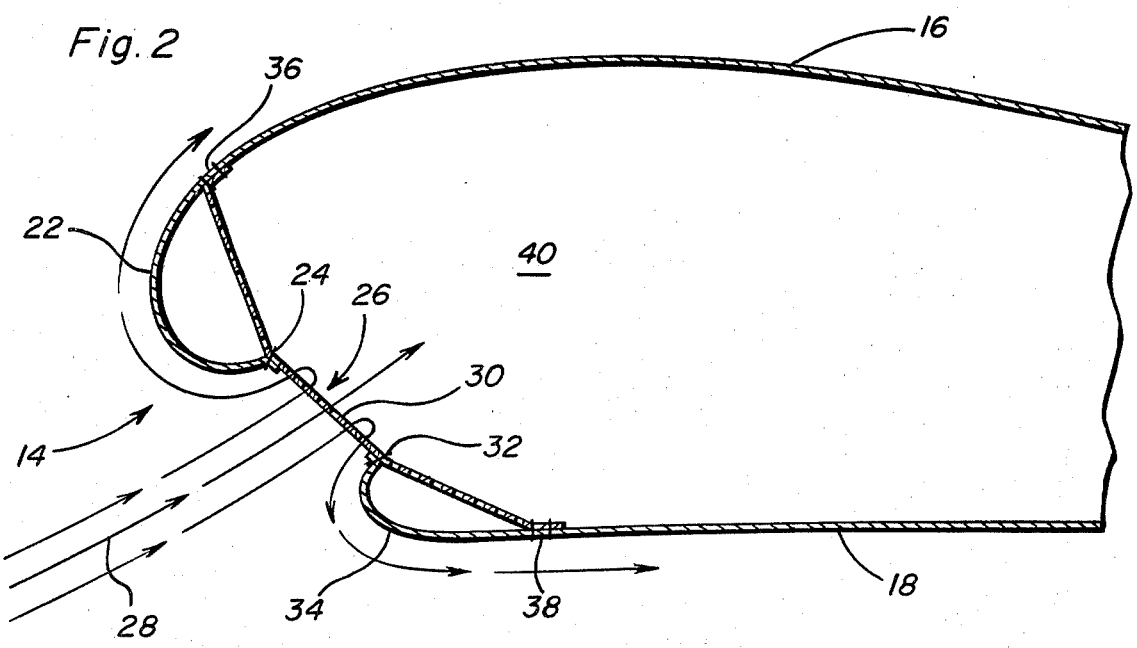
FIG. 2 is an enlarged partial section view of the leading edge portion taken substantially through a plane indicated by section line 2—2 in FIG. 1.
Figure 3:
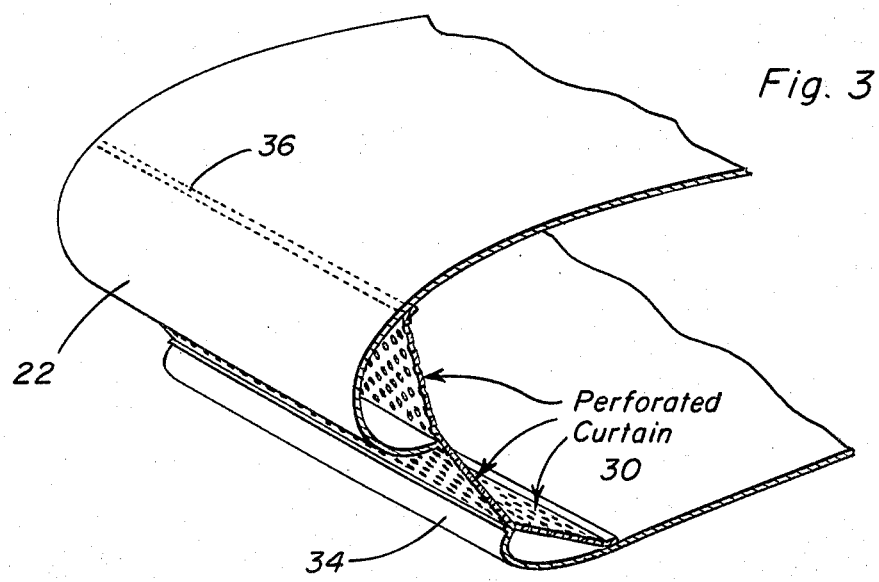
FIG. 3 is an enlarged perspective view of a cut-away section of the leading edge portion of the canopy shown in FIG. 1.

As more clearly seen in FIGS. 2 and 3, the leading edge portion 14 of the inflated canopy includes an upper lip section 22 that is curved and extends tangentially from the upper surface member 16. The lip section 22 thereby forms a smooth transition surface between the upper surface member 16 and the upper spanwise extending edge 24 of an air scoop opening 26 through which an inflow of air enters the canopy as denoted by arrows 28 in FIG. 2. The lip section 22 is secured by stitching at the upper edge 24 of the opening to a perforated baffling curtain 30 which is also secured at a lower edge 32 of the opening to a lower lip section 34. The curtain 30 is also secured as by stitching to the upper and lower surface members from points of tangency 36 and 38 from which the lip sections extend forwardly. As shown, the radius of curvature of the lower lip section 34 is smaller than that of the upper lip section and also forms a smooth transition surface between the air scoop opening 26 and the lower surface member 18. Further, the lip sections form a rearwardly converging air scoop passage terminated at the opening 26.

The perforated curtain 30 in addition to separating the dynamic air flow region in the air scoop passage from an internal static pressure region 40, maintains the lip section curvatures during inflation of the canopy as shown. The establishment of the smooth curved surfaces by the lip sections is effective to prevent airflow separation that often occurs between the lower edge of the air scoop opening and the lower surface member of the canopy. Thus, the drag effect of turbulence and airflow separation adjacent the leading edge portion of the canopy is avoided.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In an aerial device including a flexible canopy having spaced upper and lower surface members interconnected along leading and trailing edge portions, said leading edge portion being formed with an air scoop opening through which an inflow of air is received to inflate the canopy to an airfoil shape during forward glide, the improvement residing in means for reducing drag resulting from airflow separation externally of said upper and lower surface members of the canopy adjacent to the leading edge portion, comprising means interconnected between the surface members in rearward adjacency to the leading edge portion for baffling said inflow of air through the air scoop opening, said leading edge portion including curved lip sections respectively connected to the surface members of the inflated canopy and forming a smooth transition surface between the surface members and the air scoop opening, said baffling means including a perforated curtain traversing the air scoop opening to separate an external dynamic airflow region from an internal static pressure region, the perforated curtain being secured to the curved lip sections at the air scoop opening from which the lip sections extend forwardly and at the surface members of the canopy.

2. The improvement as defined in claim 1 wherein one of the curved lip sections connected to the lower surface member has a smaller radius of curvature than the other of the lip sections.

* * * * *